US012091111B1

(12) United States Patent
Zhang et al.

(10) Patent No.: US 12,091,111 B1
(45) Date of Patent: Sep. 17, 2024

(54) BIOMIMETIC TOWER CLIMBING ROBOT AND TOWER CLIMBING METHOD THEREOF

(71) Applicants: STATE GRID HUNAN ELECTRIC POWER COMPANY, Changsha (CN); STATE GRID HUNAN EXTRA HIGH VOLTAGE TRANSMISSION COMPANY, Hengyang (CN); STATE GRID CORPORATION OF CHINA, Beijing (CN)

(72) Inventors: Jian Zhang, Hengyang (CN); Dehua Zou, Hengyang (CN); Dun Mao, Hengyang (CN); Zhipeng Jiang, Hengyang (CN); Zhiqiang He, Hengyang (CN); Zhengxiong Gong, Hengyang (CN); Qiping Duan, Hengyang (CN); Bangwei Luo, Hengyang (CN); Shuwen Xiao, Hengyang (CN); Yun Xiang, Hengyang (CN); Bocheng Li, Hengyang (CN); Jie He, Hengyang (CN); Chonggen Mo, Hengyang (CN)

(73) Assignees: STATE GRID HUNAN ELECTRIC POWER COMPANY, Changsha (CN); STATE GRID HUNAN EXTRA HIGH VOLTAGE TRANSMISSION COMPANY, Hengyang (CN); STATE GRID CORPORATION OF CHINA, Beijing (CN)

( * ) Notice: Subject to any disclaimer, the term of this patent is extended or adjusted under 35 U.S.C. 154(b) by 0 days.

(21) Appl. No.: 18/700,723

(22) PCT Filed: Aug. 9, 2022

(86) PCT No.: PCT/CN2022/111101
§ 371 (c)(1),
(2) Date: Apr. 12, 2024

(87) PCT Pub. No.: WO2023/087795
PCT Pub. Date: May 25, 2023

(30) Foreign Application Priority Data

Nov. 18, 2021 (CN) .......................... 202111369986.6

(51) Int. Cl.
*B62D 57/024* (2006.01)
*B62D 57/028* (2006.01)
*B62D 57/036* (2006.01)

(52) U.S. Cl.
CPC .......... *B62D 57/024* (2013.01); *B62D 57/028* (2013.01); *B62D 57/036* (2013.01)

(58) Field of Classification Search
CPC ... B62D 57/024; B62D 57/028; B62D 57/036
See application file for complete search history.

(56) References Cited

U.S. PATENT DOCUMENTS

| 10,830,837 B2 * | 11/2020 | Oetiker | G01R 33/02 |
| 2021/0009219 A1 * | 1/2021 | Zarrouk | B62D 57/024 |

(Continued)

FOREIGN PATENT DOCUMENTS

| CN | 104129447 A | 11/2014 |
| CN | 108128364 A | 6/2018 |

(Continued)

*Primary Examiner* — Kevin Hurley
*Assistant Examiner* — Marlon A Arce
(74) *Attorney, Agent, or Firm* — Bayramoglu Law Offices LLC

(57) ABSTRACT

A biomimetic tower climbing robot and a tower climbing method thereof are provided. The robot mainly includes a main control body module and clamping and moving mechanism modules; two ends of the main control body module are connected to one clamping and moving mechanism module through an elastic universal joint respectively, two clamping and moving mechanism modules can alter- (Continued)

nately lock and unlock an anti-fall track of an iron tower, and the main control body module alternately pushes the clamping and moving mechanism module at its upper end upwards and pulls the clamping and moving mechanism module at its lower end upwards to achieve climbing of the robot along the anti-fall track.

6 Claims, 4 Drawing Sheets

(56) References Cited

U.S. PATENT DOCUMENTS

| | | | | |
|---|---|---|---|---|
| 2021/0253187 A1* | 8/2021 | Li | ............................. | B25J 5/00 |
| 2021/0323619 A1* | 10/2021 | Myeong | ............... | B62D 57/028 |
| 2021/0324900 A1* | 10/2021 | Murakoshi | .............. | F16B 47/00 |
| 2023/0311296 A1* | 10/2023 | Murray | .................... | B25J 9/102 |
| | | | | 700/135 |

FOREIGN PATENT DOCUMENTS

| | | |
|---|---|---|
| CN | 108471079 A | 8/2018 |
| CN | 111591933 A | 8/2020 |
| CN | 111614018 A | 9/2020 |
| CN | 111614019 A | 9/2020 |
| CN | 111618880 A | 9/2020 |
| CN | 113895536 A | 1/2022 |

* cited by examiner

BIOMIMETIC TOWER CLIMBING ROBOT AND TOWER CLIMBING METHOD THEREOF

CROSS REFERENCE TO THE RELATED APPLICATIONS

This application is the national phase entry of International Application No. PCT/CN2022/111101, filed on Aug. 9, 2022, which is based upon and claims priority to Chinese Patent Application No. 202111369986.6, filed on Nov. 18, 2021, the entire contents of which are incorporated herein by reference.

TECHNICAL FIELD

The invention belongs to the field of power transmission line tower climbing maintenance operations, and specifically relates to a biomimetic tower climbing robot and a tower climbing method thereof.

BACKGROUND

Tower climbing is a key link and basic work for power grid maintenance safety management and control. Tower climbing with bare hands faces the following crux:
(1) The problem of falling from high altitude when climbing a tower has not been eliminated and has always been a pain point in power work;
(2) The physical strength consumed by climbing a 100-meter iron tower is equivalent to climbing a 50-story high-rise building without stopping. A large amount of physical strength will increase the safety risk of continuous operations;
(3) It is very difficult to climb the tower vertically using foot spikes with small acting points and wide spacing. In addition, the maintenance tasks of transmission lines have also intensified with the increase in the scale of the power grid in recent years, which puts forward higher requirements for personnel quality, safety control, and work efficiency.

SUMMARY

The object of the present invention is to provide a biomimetic tower climbing robot and a tower climbing method thereof capable of simulating the automatic climbing of workers along the iron tower anti-fall track.

The technical solution of the biomimetic tower climbing robot provided by the present invention is: mainly includes a main control body module and clamping and moving mechanism modules; two ends of the main control body module are connected to one clamping and moving mechanism module through an elastic universal joint respectively, two clamping and moving mechanism modules can alternately lock and unlock an anti-fall track of an iron tower, and the main control body module alternately pushes the clamping and moving mechanism module at its upper end upwards and pulls the clamping and moving mechanism module at its lower end upwards to achieve climbing of the robot along the anti-fall track;

In one embodiment of the above technical solution, the main control body module includes a shell, a main motor, a driving gear, a driven gear, a rotating shaft, a telescopic screw, screw sockets, and clamping plate seats; an output shaft of the main motor passes through the driving gear, the driven gear meshes up and down with the driving gear, the driven gear is fixed to a middle part of the rotating shaft, and the rotating shaft is a hollow shaft; the telescopic screw includes a large diameter screw and a small diameter screw that are sleeved, and outer walls of the large diameter screw and the small diameter screw are provided with an axial through groove respectively; the large diameter screw and the small diameter screw are connected to a screw socket respectively, and threads of the two screw sockets are in opposite turning directions; inner ends of the two screw sockets are connected to two ends of the rotating shaft respectively, outer ends of the two screw sockets are connected to the clamping plate seats respectively, and clamping plates inserted into the axial through grooves of the large diameter screw and the small diameter screw are arranged on the two clamping plate seats respectively; a shell sealed on four sides is arranged between the two clamping plate seats, and a power supply is fixed on the shell;

In one embodiment of the above technical solution, a guide rod is connected between the two clamping plate seats.

In one embodiment of the above technical solution, the clamping and moving mechanism module includes a servo, a gear pair, a traction swing rod, a cam compaction block, a clamping and moving seat, a compaction wheel, and side positioning wheels; the servo is mounted on a side of the clamping and moving seat in a width direction, a driving gear of the gear pair is fixed to an output shaft of the servo, an axle of a driven gear of the gear pair passes vertically through a middle part of the clamping and moving seat in the width direction, and a passing segment is a flat axle segment; the cam compaction block and the traction swing rod are connected to the flat axle segment, the cam compaction block is embedded in a notch on the traction swing rod, and an outer wall of a hinged segment of the traction swing rod is in an arc shape provided with cylindrical teeth; the compaction wheel is mounted at an outer end of the middle part of the clamping and moving seat in the width direction, and the side positioning wheels are symmetrically connected to two sides of the clamping and moving seat in the width direction;

In one embodiment of the above technical solution, the driving gear of the gear pair meshes with a rack perpendicular to the axle of the driven gear, the rack is embedded on a servo mounting side of the clamping and moving seat, a positioning plate is arranged on an upper side of the rack, and a guide groove plate for moving of the positioning plate is fixed to a top surface, corresponding to a rack embedding groove, of the clamping and moving seat.

In one embodiment of the above technical solution, a position sensor is fixed to two ends of a travel groove corresponding to the positioning plate on the clamping and moving seat respectively, an electromagnetic lock is fixed to an arm of a corresponding traction swing rod on the clamping and moving seat.

In one embodiment of the above technical solution, a tail end of the arm of the traction swing rod of the clamping and moving mechanism module connected to the upper end of the main control body module is hinged with a wire hanging pulley.

In one embodiment of the above technical solution, the two ends of the main control body module are connected to the elastic universal joints through the large diameter screw and the small diameter screw respectively, and the clamping moving mechanism modules are connected to the elastic universal joints through the clamping and moving seats.

In one embodiment of the above technical solution, the main control body module further includes positioning square pin rods and position sensors, one position sensor is mounted on same sides of the two clamping plate seats respectively, elastic universal joint connection ends of the two clamping and moving seats are connected to one positioning square pin rod on same sides of the position sensors respectively, the other ends of the positioning square pin rod pass through the clamping plate seats, and three magnets are fixed on upper part, middle part and lower part of the positioning square pin rod.

The tower climbing method of this above-mentioned robot provided by the present invention includes the following steps:

(1) Lock the clamping and moving mechanism modules at both ends of the robot on the anti-fall track;
(2) Make the clamping and moving mechanism module at the upper end unlock the anti-fall track, and the clamping and moving mechanism module at the lower end keep locking the anti-fall track;
(3) The main control body module is in the initial state: the telescopic screw is in the retracted state, the position sensor on the upper clamping plate seat corresponds to the position of the uppermost magnet of the positioning square pin rod, and the position sensor on the lower clamping plate seat corresponds to the position of the bottom magnet of the positioning square pin rod;
(4) The main motor of the main control body module works, so that the large diameter screw of the telescopic screw extends upwards and promotes the clamping and moving mechanism module at its upper end to move up along the anti-fall track;
(5) The position sensor of the main control body module senses the bottom magnet on the positioning square pin rod, the main motor stops working, and the clamping and moving mechanism module at the upper end locks the anti-fall track;
(6) The clamping and moving mechanism module at the lower end unlock the anti-fall track, and the track locking module at the upper end keeps locking the anti-fall track;
(7) The main motor of the main control body module works, the small diameter screw of the telescopic screw shrinks, and the clamping and moving mechanism module at the lower end of the robot is pulled up. When the position sensor on the lower clamping plate seats of the main control body module senses the magnet at the bottom of the lower positioning square pin rod, the main motor stops working, and the robot completes one climb.
(8) Repeat steps (4)-(7) to realize the normal climbing up of the robot on the anti-fall track;
(9) When the anti-fall track has a turning point and the robot turns during the climbing process, the position sensor on the clamping plate seats stops when it receives the signal from the middle magnet, forming a shorter stroke to facilitate the robot's safely turning and climbing.

The working principle of this robot is as follows: the main control body module is responsible for robot control, power provided and robot movement; the clamping and moving mechanism modules at the upper and lower ends of the main control body module can lock the anti-fall track, and through the alternate locking of the clamping and moving mechanism modules, cooperate with the alternate extension and contraction of the telescopic screw of the main control body module to realize climbing along the anti-fall track: the main control body module first pushes the clamping and moving mechanism module at the upper end up for a set stroke and locks the anti-fall track, and then the clamping and moving mechanism module at the lower end pulls up a set stroke, imitating the movement of people climbing a tower. The elastic universal joint is used as a connecting piece to reliably connect the clamping mobile mechanism and the main control body, which can effectively absorb shock and control the direction of the clamping and moving mechanism, and prevent the clamping and moving mechanism from shifting too much to both sides during the movement and affect the movement of the robot. Achieve smooth climbing of the robot. The traction swing rod of the clamping the mobile mechanism module at the upper end is used in conjunction with the rope pulley to provide backup protection for people or objects, and the traction swing rod of the clamping the mobile mechanism module at the lower end is used with ropes to lift people or objects by relying on related devices; the position sensor between the main control body module and the clamping and moving mechanism module controls the unit stroke movement of the robot to prevent the screw from coming off and ensure the stable movement of the robot. This robot can carry ropes to climb up the tower at the beginning of the operation, and after being fixed at the designated position, it provides a reliable load-bearing point for subsequent operations. Relying on this load-bearing point, according the needs of the operation, it can be combined with corresponding devices to carry workers, work tools, related hardware, etc. When the transmission line tower fails in extreme weather, and manual tower climbing inspection and drone inspection cannot be carried out, the robot can carry relevant detection devices on the tower to inspect and detect the fault point.

DETAILED DESCRIPTION OF THE EMBODIMENTS

Figure 1:
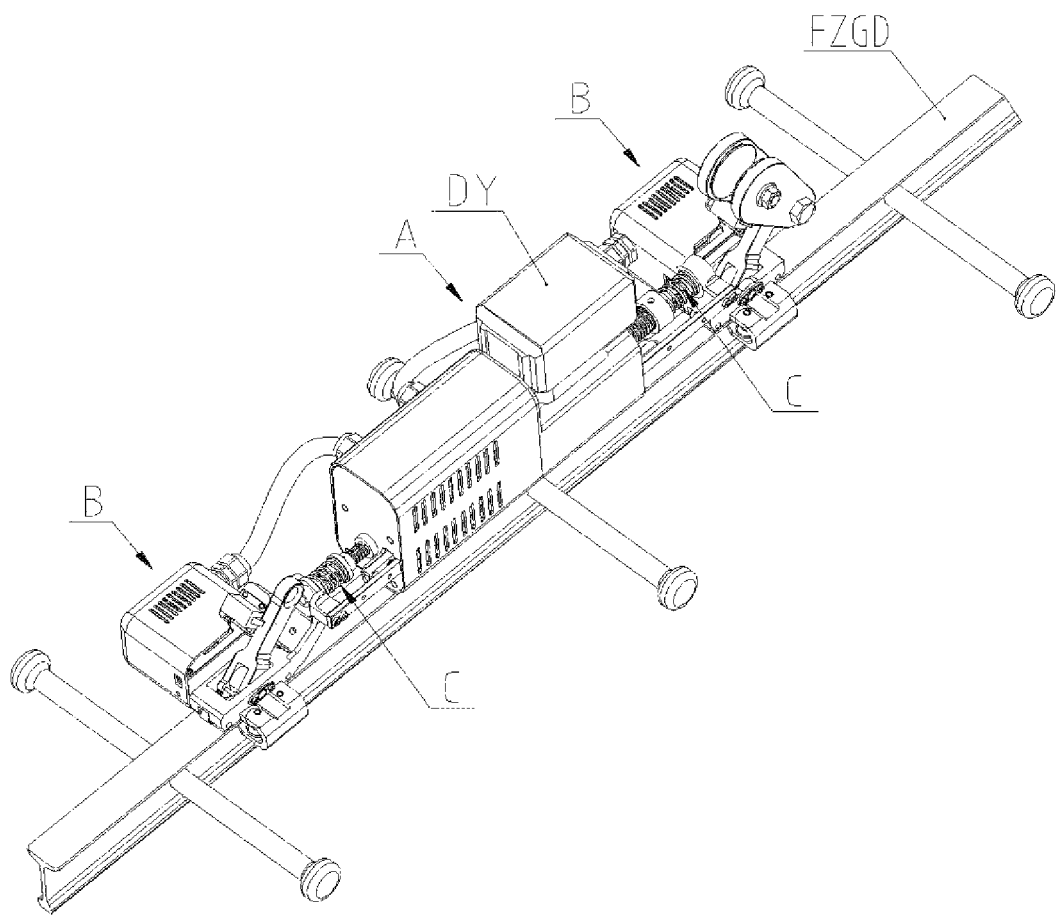
FIG. 1 is a schematic diagram of an axonometric structure of an embodiment of the present invention installed on an anti-fall track of an iron tower.
Figure 2:
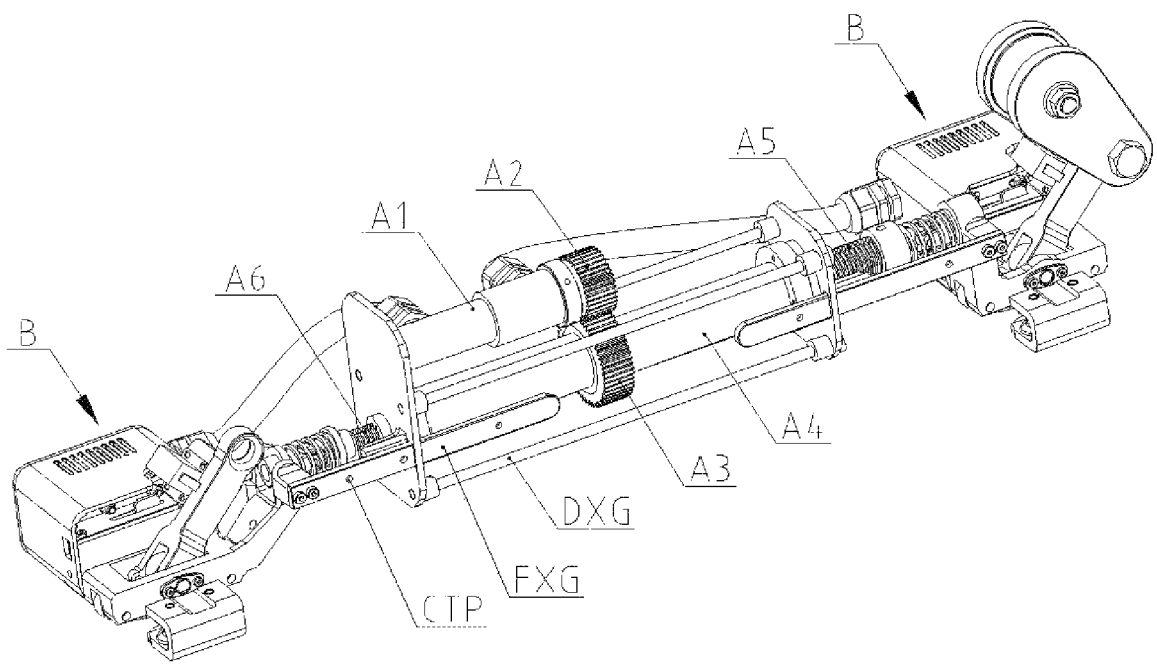
FIG. 2 is an enlarged schematic diagram of this embodiment after removing the shell and the power supply.
Figure 3:
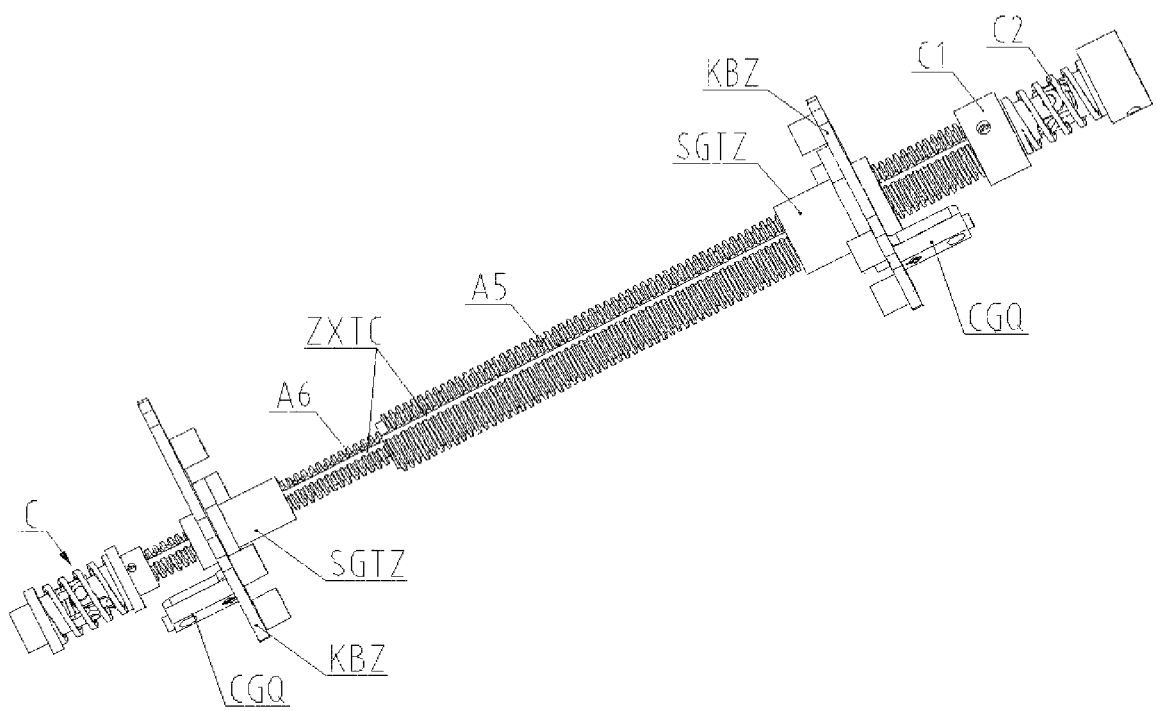
FIG. 3 is an enlarged schematic diagram of the assembly structure of the telescopic screw, the screw sockets, the clamping plate seats and the elastic universal joint in FIG. 2.
Figure 4:
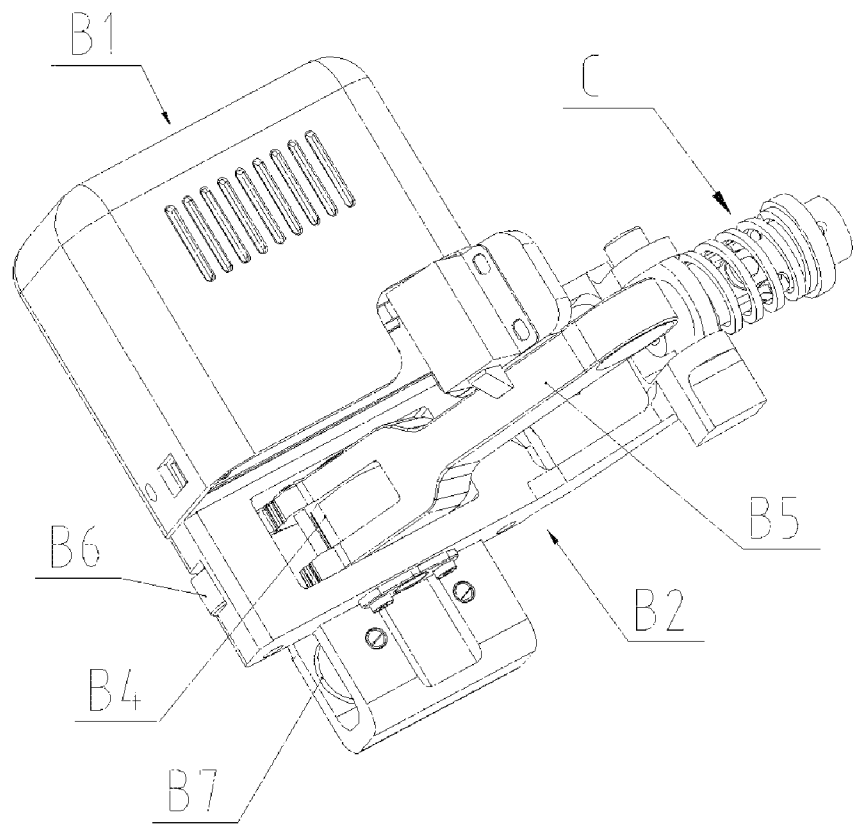
FIG. 4 is an enlarged structural schematic diagram of the clamping and moving mechanism module under the main control body module in FIG. 2.
Figure 5:
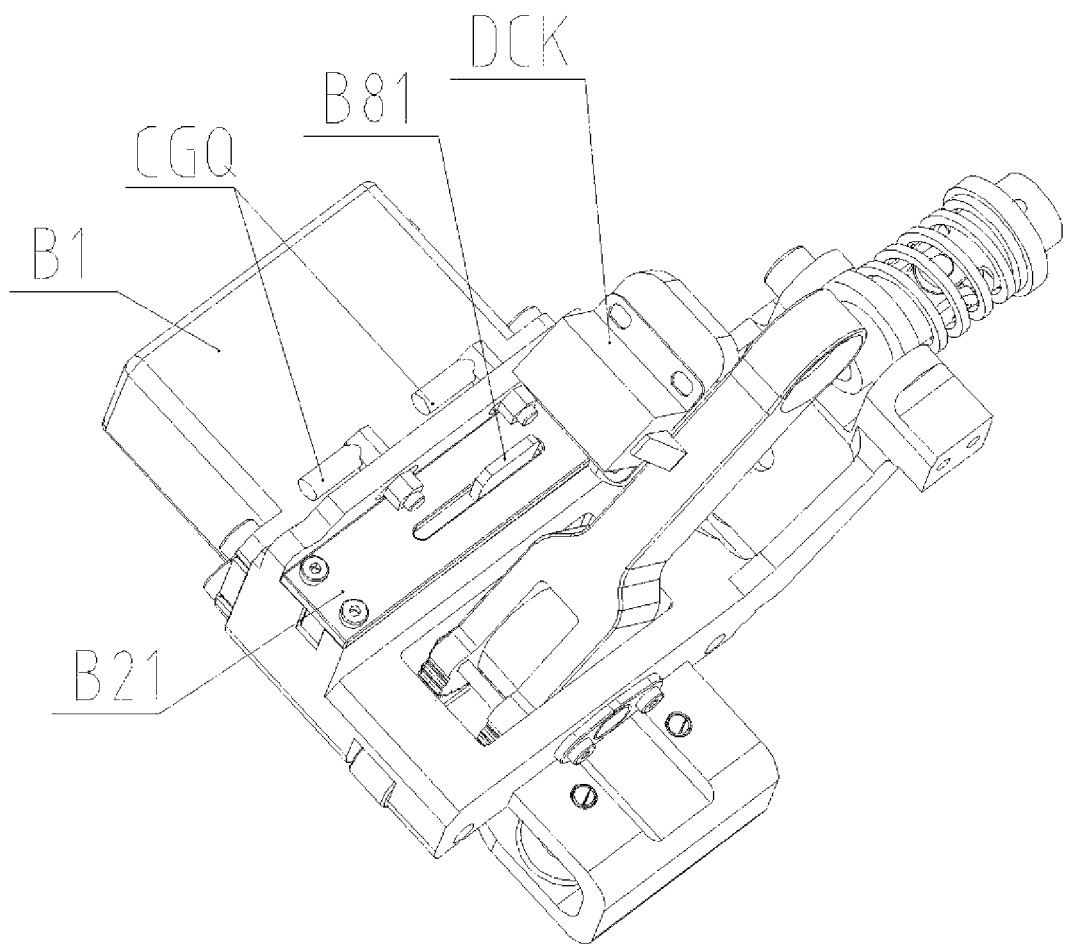
FIG. 5 is a schematic structural view of FIG. 4 after the servo cover is removed.
Figure 6:
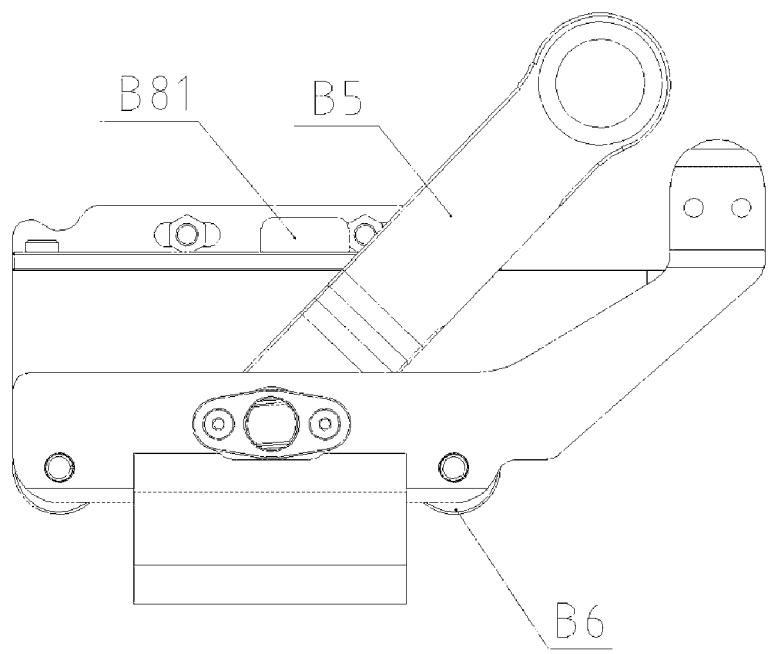
FIG. 6 is the left view structural diagram of FIG. 4
Figure 7:
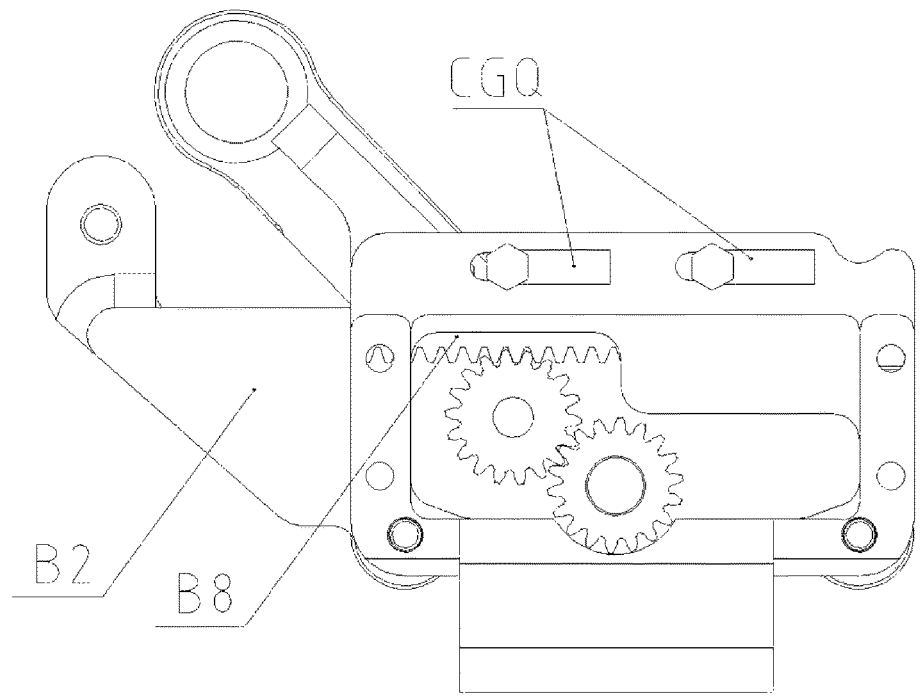
FIG. 7 is the right view structural diagram of FIG. 4 after removing the servo.
Figure 8:
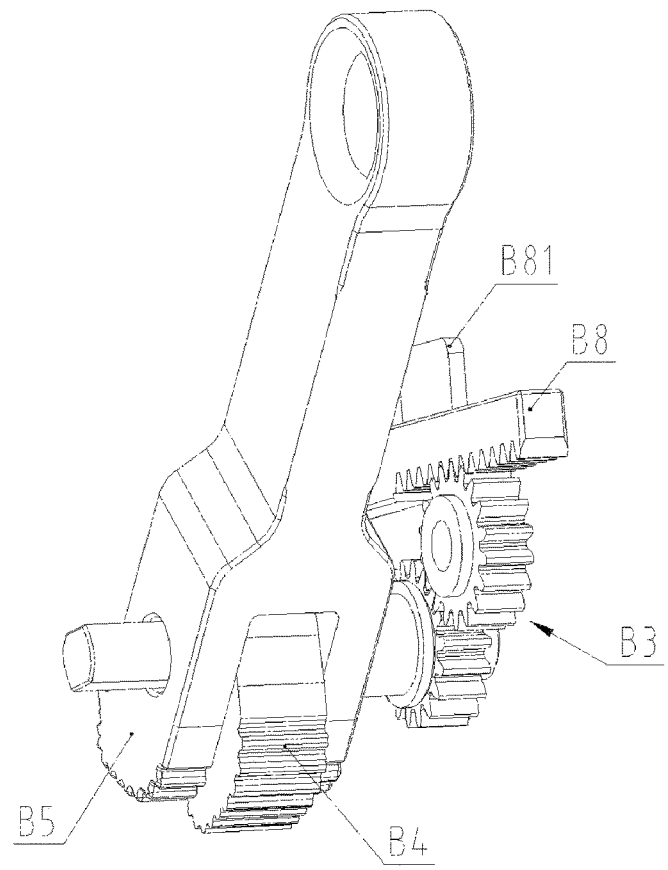
FIG. 8 is an assembly structural diagram of the gear pair, the cam compaction block, the traction swing rod and the rack.

From FIGS. 1 to 8, it can be seen that the biomimetic tower climbing robot disclosed in this embodiment mainly includes a main control body module A and a clamping and moving mechanism modules B. Two ends of the main control body module A are respectively connected to one clamping and moving mechanism module B through an elastic universal joint C.

The main control body module A includes a shell, a main motor, a driving gear, a driven gear, a rotating shaft, a telescopic screw, screw sockets and clamping plate seats;

The main motor A1 adopts a servo motor, its output shaft is connected to the driving gear A2 through a coupling, the driven gear A3 meshes directly under the driving gear, the driven gear A3 is fixed on the middle of the rotating shaft A4, and the rotating shaft is a hollow shaft.

The telescopic screw includes a large diameter screw A5 and a small diameter screw A6 that are sleeved, and the outer walls of the large diameter screw and the small diameter screw are provided with an axial through grooves ZXTC respectively.

The large diameter screw A5 and the small diameter screw A6 are connected to a screw socket respectively SGTZ, and threads of the two screw sockets are in opposite turning directions.

The inner ends of the two screw sockets are connected to the two ends of the rotating shaft A4 respectively, and outer ends of the two screw sockets are connected to the clamping plate seats KBZ respectively, and the two clamping plate seats are inserted into the axial through grooves of the large diameter screw A5 and the small diameter screw A6 are arranged on the two clamping plate seats respectively.

A guide rod DXG is connected between the two clamping plate seats.

A shell sealed on four sides is arranged between the two clamping plate seats KBZ, and a power supply DY is fixed on the shell.

The main control body module is used as the motion module of the robot, and its working principle is as follows:

The main motor works, so that the driving gear drives the rotating shaft to rotate through the driven gear, and the rotating shaft drives the screw sockets connected at both ends to rotate. The outer walls of the large diameter screw and the small diameter screw of the telescopic screw are equipped with axial through grooves, the screw sockets are respectively connected with clamping plate seats, and the clamping plate seats have clamps inserted into the axial through grooves on the outer wall of the corresponding screw rods, so that both the large diameter screw and the small diameter screw rod cannot be rotated, and can only be moved along the axial direction of the rotating shaft. And the threads directions of the two screw sockets are opposite, so as to realize the change of the total length of the telescopic screw. The climbing motion of the robot can be realized by changing the total length of the telescopic screw. The large diameter screw and the small diameter screw rod that are concentrically nested by the telescopic screw can minimize the length of the robot, but can ensure the climbing step.

In order to prevent dislocation between the large diameter screw and the small diameter screw, the main control body module is also equipped with a position sensing module. The position sensing module includes position sensor CGQ, positioning square pin rod FXG and magnet CTP. A position sensor is installed on the same side of the two clamping plate seats, and the elastic universal joint connection ends of the two clamping and moving seats are respectively connected to a positioning square pin rod on the same side of the position sensor, and the other end of the positioning square pin rod passes through the clamping plate seat, and three magnets are fixed on upper part, middle part and lower part of the positioning square pin rod. When the telescopic screw extension and contraction, it will drive the positioning square pin rod to move together. When the position sensor senses the magnet, it will send out a signal to change the rotation direction of the main motor. In this way, the telescopic screw can reciprocate within the stroke of the three magnet pieces, and the robot can climb without the phenomenon of coming off. The distance between the middle magnet and the magnet above it on the positioning square pin rod above the main control body module is about half of the distance between the magnet below it. The positioning square pin rod below the main control body module is arranged symmetrically with the above positioning square pin rod, that is, the distance between the middle magnet on the lower positioning square pin rod and the magnet below it is about half of that between the magnet above it.

Both ends of the telescopic screw are respectively connected with elastic universal joints C.

The elastic universal joint C includes two columnar U-shaped heads C1 and a spring C2. The two U-shaped heads are hinged to each other. The outer wall of the main body of the U-shaped head is provided with a retaining ring, and the spring is placed between the two retaining rings.

The elastic universal joint C is used as a connecting piece to reliably connect the clamping mobile mechanism modules and the main control body module, and its spring component can effectively absorb shock and control the direction of the clamping and moving mechanism, and prevent the clamping and moving mechanism from shifting too much to both sides during the movement and affect the movement of the robot. Achieve smooth climbing of the robot.

From FIG. 1, FIG. 2 and FIG. 4 to FIG. 8, it can be seen that the clamping and moving mechanism module B includes servo, clamping and moving seat, gear pair, traction swing rod, cam compaction block, compaction wheel and side positioning wheel.

The servo B1 is installed on one side in the width direction of the clamping and moving seat B2.

The driving gear of the gear pair B3 is fixed on the output shaft of the servo, and the axle of the driven gear vertically passes through the middle of the clamping and moving seat B2 in the width direction, and the passing segment is a flat axle segment.

The cam compaction block and the traction swing rod are connected to the flat axle segment, the cam compaction block is embedded in a notch on the traction swing rod B5.

An outer wall of a hinged segment of the traction swing rod B5 is in an arc shape provided with cylindrical teeth.

The compaction wheel B6 is mounted at an outer end of the middle part of the clamping and moving seat B2 in the width direction, and the side positioning wheels B7 are symmetrically connected to two sides of the clamping and moving seat B2 in the width direction;

The top of the driving gear of the gear pair B3 meshes with a rack B8 perpendicular to the axle of the driven gear, the rack is embedded on a servo mounting side of the clamping and moving seat B2. A positioning plate B81 is arranged on an upper side of the rack, and a guide groove plate B21 for moving of the positioning plate B81 is fixed to a top surface, corresponding to a rack embedding groove, of the clamping and moving seat B2;

Position sensors CGQ are respectively fixed at both ends of the travel groove corresponding to the positioning plate B81 on the clamping and moving seat B2.

An electromagnetic lock DCK is fixed at the lever arm corresponding to the traction swing rod B5 on the clamping and moving seat B2.

The end of the lever arm of the traction swing rod B5 of the clamping and moving mechanism module B connected to the upper end of the main control body module A is hinged with a back protection wire hanging pulley D.

The main function of the clamping and moving mechanism module is to lock the anti-fall track. Through the extension and contraction of the telescopic screw of the main control body module and the alternate locking of the two clamping and moving mechanism modules to the anti-fall track, the robot can climb along the anti-fall track FZGD.

The servos of the two clamping moving mechanism modules, gear pairs and the cam compaction block connected to the flat axle segment of the driven gear form a track locking module. The main function is to lock the anti-fall track to prevent the robot from falling from the anti-fall track.

The traction swing rod and the electromagnetic lock form the hanging object module, whose main function is to pull the rope, and use this module to pull up people or objects after the robot reaches the designated position.

The position sensor and the positioning plate form a position sensing module. The main function is to sense the state of the locking module, ensure its reliable locking, and prevent the robot from falling when the locking is not in place during movement.

Clamping and moving seat, compaction wheel, and side positioning wheel constitute the mobile module, whose main function is to move on the anti-fall track, which is equivalent to the "foot" of the robot.

The power of the locking module is provided by the servo. The servo drives the gear pair to rotate, and the gear pair drives the flat axle to rotate, thereby controlling the state of the cam compaction block. When the cam compaction block touches the anti-fall track, as soon as force is applied, it will be pressed tighter and tighter, so the locking function of the clamping and moving mechanism can be realized by changing the position of the cam compaction block.

The traction swing rod in the hanging object module is used to hang the rope, and after the robot reaches the designated position, it can be used as a load-bearing point to carry people or objects up. The principle is similar to the cam compaction block. Once in contact with the anti-fall track, the force will become tighter and tighter. In order to prevent the traction swing rod from being unable to release the stress state and return to the initial state after the operation is completed, a groove is specially designed on the cam compaction block, which corresponds to the cross bar on the traction swing rod. After the operation is completed, when the servo controls the cam compaction block to return to its original position, it will also bring the traction swing rod back to its original position. The electromagnetic lock is controlled by an electromagnet and is released after reaching the designated position. The traction swing rod is lowered to receive force. During the climbing process of the robot, limit the fall of the traction swing rod and comes into contact with the anti-fall track and receive force, affecting the movement of the robot.

The position sensing module is composed of two position sensors and a positioning plate. When the gear pair drives the cam compaction block to rotate, it will synchronously drive the positioning plate to move. When the position sensor senses the positioning plate, it will stop the rotation of the servo. Therefore, the position sensor is used to set two limits of the initial position and the working position of the cam compaction block to control the locking state of the clamping moving mechanism.

The main function of the mobile module is to control the state of the robot on the anti-fall track, to ensure that the robot fits the anti-fall track, so as to ensure that the clamping and moving mechanism can perform a reliable locking function.

The installation and tower climbing process of this robot is as follows:

(1) Install the clamping and moving mechanism modules at both ends of the robot on the anti-fall track, and make the track locking modules of the two modules enter the locked state; and then control the servo of the clamping and moving mechanism module at the upper end of the robot. Drive the cam compaction block of the track locking module to loosen the anti-fall track, and the track locking module at the lower end of the robot keeps locking the anti-fall track.

At this time, the main control body module is in the initial state: the telescopic screw is in the shrinking state, the position sensor on the upper clamping plate seat corresponds to the position of the uppermost magnet of the positioning square pin rod, and the position sensor on the lower clamping plate seat corresponds to the lowest magnet of the positioning square pin rod.

(2) When starting to climb, the main motor of the main control body module works, so that the large diameter screw of the telescopic screw stretches out upwards and promotes the clamping and moving mechanism module at its upper end to move up along the anti-fall track.

(3) When the position sensor of the main control body module senses the bottom magnet on the positioning square pin rod, the main motor stops working, the upper track locking module enters the locked state, and the clamping movement mechanism locks the anti-fall track.

(4) The servo of the clamping and moving mechanism module at the lower end of the robot works, causing the track locking module to loosen the anti-fall track, and the track locking module at the upper end keeps locking the anti-fall track.

(5) The main motor of the main control body module works, and the small diameter screw of the telescopic screw contracts, pulling the clamping and moving mechanism module at the lower end of the robot upward. When the position sensor on the clamping plate seats at the lower end of the main control body module senses the magnet at the bottom of the lower positioning square pin rod, the main motor stops working, and the robot completes a climb.

Reciprocating in this way, the normal climbing of the robot on the anti-fall track can be realized during the entire climbing process.

When there is a bend in the anti-fall track and the robot turns during the climb, the position sensor on the clamping plate seats will stop moving after receiving the signal from the middle magnet, forming a shorter stroke to facilitate the robot to safely turn and climb.

The working principle of this robot is as follows: the main control body module is responsible for robot control, power provided and robot movement; the clamping and moving mechanism modules at the upper and lower ends of the main control body module can lock the anti-fall track, and through the alternate locking of the clamping and moving mechanism modules, with the alternate extension and contraction of the telescopic screw rod of the main control body module to realize climbing along the anti-fall track: the main control body module first pushes the clamping and moving mechanism module at the upper end up for a set stroke and locks the anti-fall track, and then the clamping and moving mechanism module at the lower end pulls up a set stroke, imitating the movement of people climbing a tower. The elastic universal joint is used as a connecting piece to reliably connect the clamping mobile mechanism and the main control body, which can effectively absorb shock and control the direction of the clamping and moving mechanism, and prevent the clamping and moving mechanism from shifting too much to both sides during the movement and affect the movement of the robot. Achieve smooth climbing of the robot. The traction swing rod of the clamping the mobile mechanism module at the upper end is used in conjunction with the rope pulley to provide backup protection for people or objects, and the traction swing rod of the clamping the mobile mechanism module at the lower end is used with ropes to lift people or objects by relying on related devices; the position sensor between the main control body module and the clamping and moving mechanism module controls the unit stroke movement of the robot to prevent the screw from coming off and ensure the stable movement of the robot. This robot can carry ropes to climb up the tower at the beginning of the operation, and after being fixed at the designated position, it provides a reliable load-bearing point for subsequent operations. Relying on this load-bearing point, according the needs of the operation, it can be combined with corresponding devices to carry workers, work tools, related hardware, etc. When the transmission line tower fails in extreme weather, and manual tower climbing inspection and drone inspection cannot be carried out, the robot can carry relevant detection devices on the tower to inspect and detect the fault point.

What is claimed is:

1. A biomimetic tower climbing robot, characterized in that the biomimetic tower climbing robot mainly comprises a main control body module and clamping and moving mechanism modules, an upper end and a lower end of the main control body module are connected to one clamping and moving mechanism module through an elastic universal joint respectively, two clamping and moving mechanism modules can alternately lock and unlock an anti-fall track of an iron tower, and the main control body module alternately pushes the clamping and moving mechanism module at its upper end upwards and pulls the clamping and moving mechanism module at its lower end upwards to achieve climbing of the robot along the anti-fall track;

the main control body module comprises a shell, a main motor, a driving gear, a driven gear, a rotating shaft, a telescopic screw, screw sockets, and clamping plate seats; an output shaft of the main motor passes through the driving gear, the driven gear meshes up and down with the driving gear, the driven gear is fixed to a middle part of the rotating shaft, and the rotating shaft is a hollow shaft; the telescopic screw comprises a large diameter screw and a small diameter screw that are sleeved, and outer walls of the large diameter screw and the small diameter screw are provided with an axial through groove respectively; the large diameter screw and the small diameter screw are connected to a screw socket respectively, and threads of the two screw sockets are in opposite turning directions; inner ends of the two screw sockets are connected to two ends of the rotating shaft respectively, outer ends of the two screw sockets are connected to the clamping plate seats respectively, and clamping plates inserted into the axial through grooves of the large diameter screw and the small diameter screw are arranged on the two clamping plate seats respectively; a shell sealed on four sides is arranged between the two clamping plate seats, and a power supply is fixed on the shell;

the clamping and moving mechanism module comprises a servo, a gear pair, a traction swing rod, a cam compaction block, a clamping and moving seat, a compaction wheel, and side positioning wheels; the servo is mounted on a side of the clamping and moving seat in a width direction, a driving gear of the gear pair is fixed to an output shaft of the servo, an axle of a driven gear of the gear pair passes vertically through a middle part of the clamping and moving seat in the width direction, and a passing segment is a flat axle segment; the cam compaction block and the traction swing rod are connected to the flat axle segment, the cam compaction block is embedded in a notch on the traction swing rod, and an outer wall of a hinged segment of the traction swing rod is in an arc shape provided with cylindrical teeth; the compaction wheel is mounted at an outer end of the middle part of the clamping and moving seat in the width direction, and the side positioning wheels are symmetrically connected to two sides of the clamping and moving seat in the width direction;

the driving gear of the gear pair meshes with a rack perpendicular to the axle of the driven gear, the rack is embedded on a servo mounting side of the clamping and moving seat, a positioning plate is arranged on an upper side of the rack, and a guide groove plate for moving of the positioning plate is fixed to a top surface, corresponding to a rack embedding groove, of the clamping and moving seat; and a position sensor is fixed to two ends of a travel groove corresponding to the positioning plate on the clamping and moving seat respectively.

2. The biomimetic tower climbing robot according to claim 1, characterized in that a guide rod is connected between the two clamping plate seats.

3. The biomimetic tower climbing robot according to claim 1, characterized in that an electromagnetic lock is fixed to an arm of a corresponding traction swing rod on the clamping and moving seat.

4. The biomimetic tower climbing robot according to claim 1, characterized in that a tail end of the arm of the traction swing rod of the clamping and moving mechanism module connected to the upper end of the main control body module is hinged with a wire hanging pulley.

5. The biomimetic tower climbing robot according to claim 1, characterized in that the two ends of the main control body module are connected to the elastic universal joints through the large diameter screw and the small diameter screw respectively, and the clamping moving mechanism modules are connected to the elastic universal joints through the clamping and moving seats.

6. The biomimetic tower climbing robot according to claim 5, characterized in that the main control body module further comprises positioning square pin rods and position sensors, one position sensor is mounted on same sides of the two clamping plate seats respectively, elastic universal joint connection ends of the two clamping and moving seats are connected to one positioning square pin rod on same sides of the position sensors respectively, the other ends of the positioning square pin rods pass through the clamping plate seats, and three magnets are fixed on upper part, middle part and lower part of the positioning square pin rod.

* * * * *